(12) United States Patent
Kawano

(10) Patent No.: US 12,411,593 B2
(45) Date of Patent: Sep. 9, 2025

(54) INFORMATION PROCESSING SYSTEM FOR PROVIDING FILE IMAGE INFORMATION, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Yusuke Kawano, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 392 days.

(21) Appl. No.: 17/901,631

(22) Filed: Sep. 1, 2022

(65) Prior Publication Data
US 2023/0315268 A1 Oct. 5, 2023

(30) Foreign Application Priority Data
Mar. 29, 2022 (JP) .................................. 2022-053686

(51) Int. Cl.
*G06F 3/04812* (2022.01)
*G06F 3/04845* (2022.01)
*G06F 3/0482* (2013.01)

(52) U.S. Cl.
CPC ...... *G06F 3/04845* (2013.01); *G06F 3/04812* (2013.01); *G06F 3/0482* (2013.01); *G06F 2203/04804* (2013.01)

(58) Field of Classification Search
CPC ............. G06F 3/04845; G06F 3/04812; G06F 3/0482; G06F 2203/04804; G06F 3/04817; G06F 2203/04806
See application file for complete search history.

(56) References Cited

U.S. PATENT DOCUMENTS

| | | | |
|---|---|---|---|
| 2002/0089518 A1* | 7/2002 | Shigeta | G06F 3/14 715/790 |
| 2008/0282196 A1* | 11/2008 | Park | H04M 1/72445 715/838 |
| 2013/0104065 A1* | 4/2013 | Stecher | G06F 3/04842 715/767 |
| 2016/0313805 A1* | 10/2016 | Vroom | G06F 3/038 |
| 2017/0123596 A1 | 5/2017 | Kashima | |
| 2021/0243314 A1* | 8/2021 | Munetomo | G06F 3/04817 |

FOREIGN PATENT DOCUMENTS

JP  2008-077210 A  4/2008
JP  2009-175935 A  8/2009

OTHER PUBLICATIONS

May 25, 2023 extended Search Report issued in European Patent Application No. 22197153.4.

* cited by examiner

*Primary Examiner* — Rinna Yi
(74) *Attorney, Agent, or Firm* — Oliff PLC

(57) ABSTRACT

An information processing system includes a processor configured to: cause an enlarged image to be displayed if a file image is selected, the file image being an image which is displayed on a display and which corresponds to a file, and the enlarged image being an image which corresponds to a selected file image, that is, the file image that is selected, and which has a larger display size than the selected file image; and cause a file-corresponding image to be displayed on the display if the selected file image is positioned behind the enlarged image, the file-corresponding image being an image that corresponds to the selected file image.

10 Claims, 17 Drawing Sheets

FIG. 16

| FILE IDENTIFIER | FILE NAME | ICON POSITION | THUMBNAIL IMAGE PATH | ENLARGED IMAGE PATH | FILE PATH | ... |
|---|---|---|---|---|---|---|
| 1001 | Sample1 | (120, 80) | /root/1001/small.jpeg | /root/1001/large.jpeg | /root/1001/origin.pdf | ... |
| 1002 | Sample2 | (180, 130) | /root/1002/small.peg | /root/1002/large.jpeg | /root/1002/origin.pdf | ... |
| 1003 | Sample3 | (60, 90) | /root/1003/small.peg | /root/1003/large.jpeg | /root/1003/origin.pdf | ... |
| ... | ... | | | | ... | ... |

INFORMATION PROCESSING SYSTEM FOR PROVIDING FILE IMAGE INFORMATION, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-053686 filed Mar. 29, 2022.

BACKGROUND

(i) Technical Field

The present disclosure relates to an information processing system, an information processing method, and a non-transitory computer readable medium.

(ii) Related Art

Japanese Unexamined Patent Application Publication No. 2009-175935 relates to an image display device having, on a display screen, a preview image area in which a preview image is displayed and a thumbnail display area in which multiple thumbnail images smaller than the preview image are displayed, and discloses a configuration that enlarges the preview display area and reduces the thumbnail display area, or displays the thumbnail image to match the reduced thumbnail display area without changing the size of the thumbnail image, depending on the position of a pointer.

SUMMARY

When a file image is selected, for example, if an image which corresponds to the selected file image and which has a larger display size than the file image is displayed, the user obtains information about the file image more easily. However, if the file image is positioned behind the image that is displayed when the file image is selected, information about the file image is hidden, making it difficult for the user to obtain information about the file image.

Aspects of non-limiting embodiments of the present disclosure relate to providing information about a selected file image to the user in the case where the file image is positioned behind an image that is displayed in association with the selection of the file image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to: cause an enlarged image to be displayed if a file image is selected, the file image being an image which is displayed on a display and which corresponds to a file, and the enlarged image being an image which corresponds to a selected file image, that is, the file image that is selected, and which has a larger display size than the selected file image; and cause a file-corresponding image to be displayed on the display if the selected file image is positioned behind the enlarged image, the file-corresponding image being an image that corresponds to the selected file image.

BRIEF DESCRIPTION OF THE DRAWINGS

An exemplary embodiment of the present disclosure will be described in detail based on the following figures, wherein:

FIG. 16 is a diagram illustrating an example of information managed by an information processing system.

DETAILED DESCRIPTION

Figure 1:
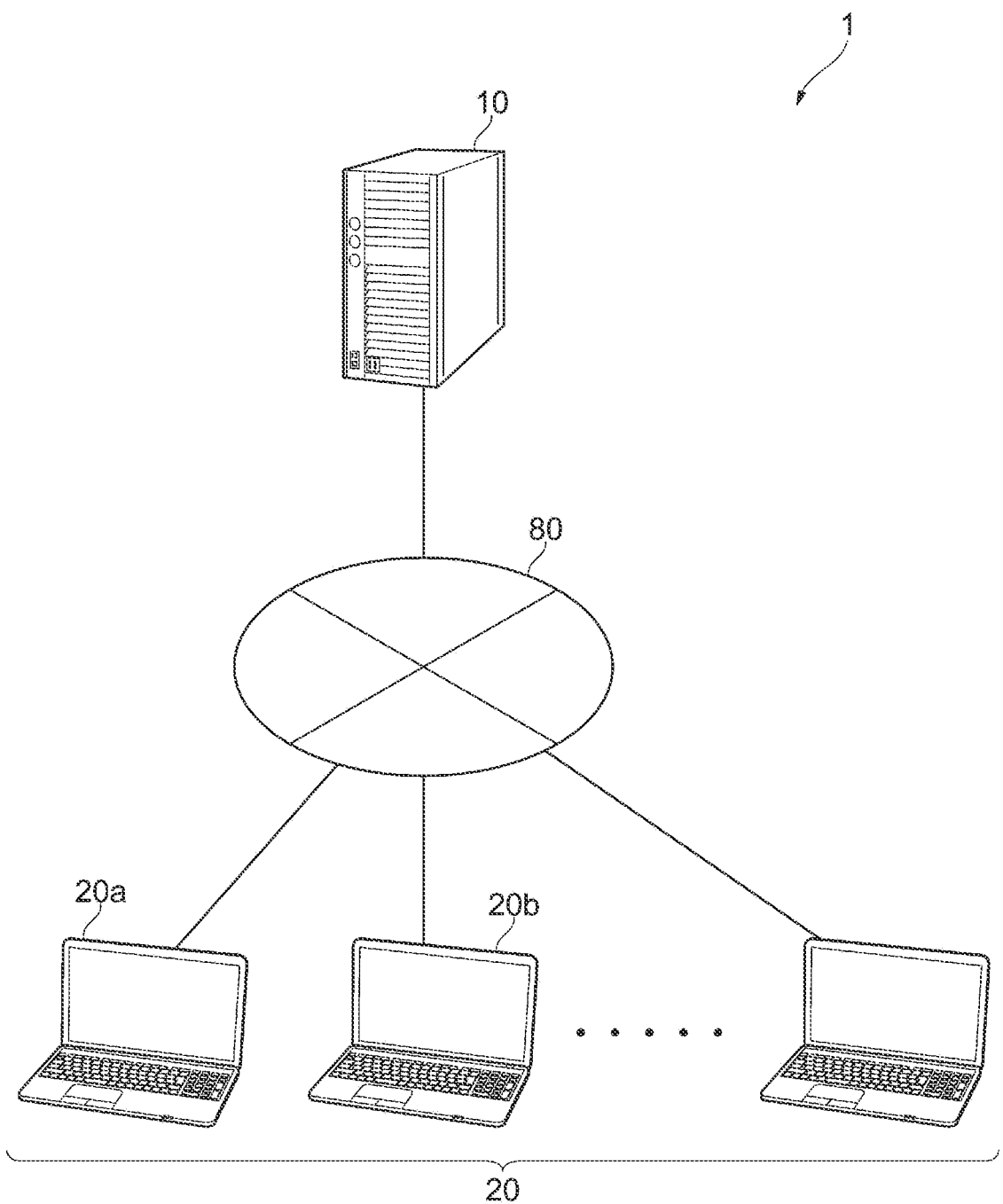
FIG. 1 is a diagram illustrating an exemplary overall configuration of an information processing system.

Hereinafter, an exemplary embodiment of the present disclosure will be described in detail and with reference to the attached drawings. FIG. 1 is a diagram illustrating an overall configuration example of an information processing system 1 to which the exemplary embodiment is applied. The information processing system 1 according to the exemplary embodiment is configured by connecting, over a communication network 80, a server device 10 that manages files and terminal devices 20 (20a, 20b, and so on) used by users for viewing files. The communication network 80 is a network such as the Internet, for example, and is used to communicate information between the server device 10 and the terminal devices 20. In the information processing system 1 according to the exemplary embodiment, it is assumed that files uploaded to the server device 10 are viewed and edited on the terminal devices 20.

Note that in the exemplary embodiment, a "file" refers to an electronic file stored in the server device 10 or the like. A file may include an image in addition to text, or include an image only without text. Moreover, a file may not only include document data or image data, but also information to be used when converting document data into an image and attribute information such as the file modification date and time, a paper size, a number of pages, and keywords inside the file.

The server device 10 is a device for managing files uploaded from the terminal devices 20. The files managed by the server device 10 are shared by multiple users and may be edited by one or multiple users. The server device 10 is realized by a computer device, for example. The server device 10 may be configured as a single computer or may be realized through distributed processing performed by multiple computers.

The terminal device 20 is a device for viewing and editing files managed in the server device 10. The terminal device 20 includes a display that displays images corresponding to files. The terminal device 20 is provided with a computer device. Forms of the terminal device 20 include a desktop personal computer (PC), a laptop PC, a tablet information terminal, a smartphone, and a game console, for example.

Figure 2:
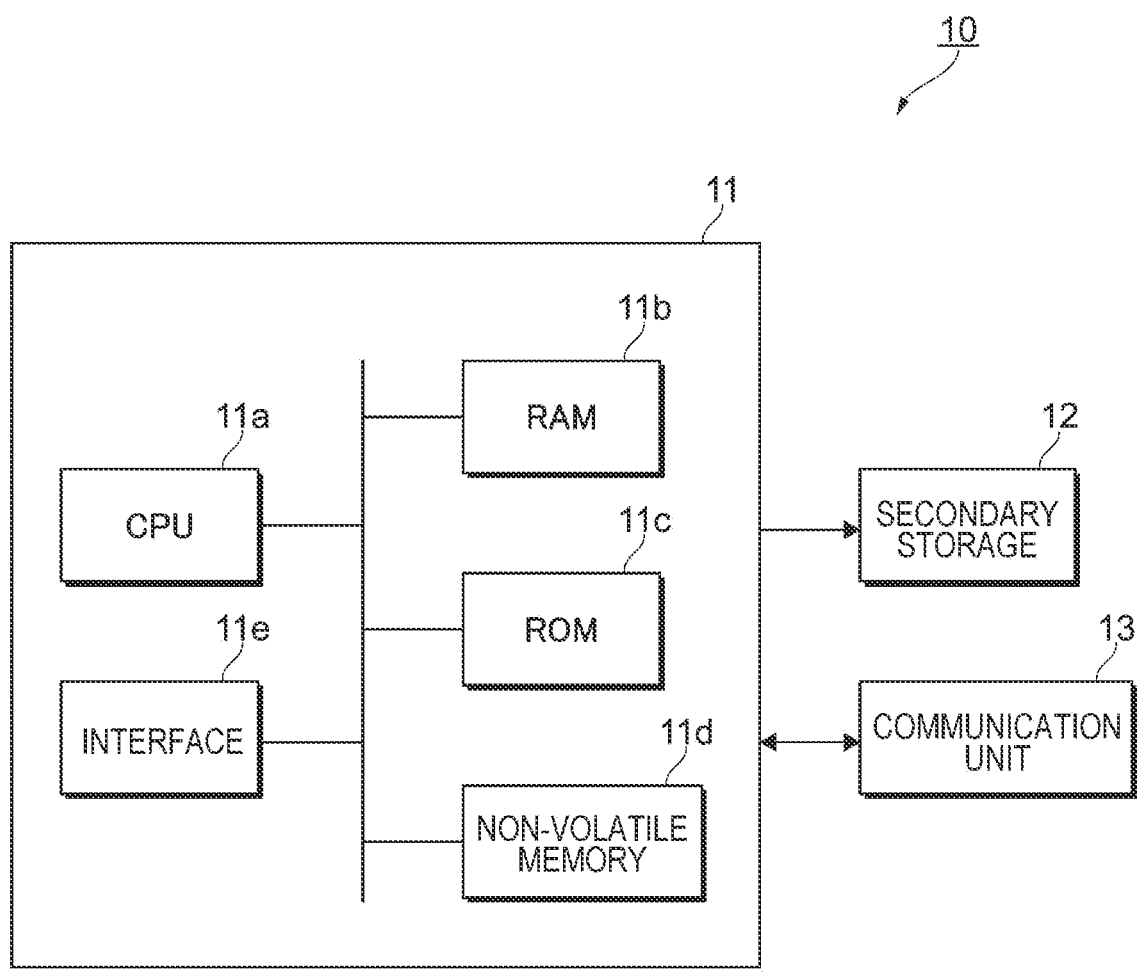
FIG. 2 is a block diagram illustrating an example of a hardware configuration of a server device.

A hardware configuration of the server device 10 will be described. FIG. 2 is a block diagram illustrating an example of a hardware configuration of the server device 10 according to the exemplary embodiment. The server device 10 includes a computational processing unit 11 that executes digital computational processing according to a program for managing files, secondary storage 12 in which files and the like are recorded, and a communication unit 13 that transmits and receives information over the communication network 80 (see FIG. 1). The secondary storage 12 is realized by an existing information storage device such as a hard disk drive (HDD), semiconductor memory, or magnetic tape, for example.

The computational processing unit 11 is provided with a CPU 11a as one example of a processor. The CPU 11a controls the server device 10 as a whole. The computational processing unit 11 is also provided with RAM 11b used as a working memory of the CPU 11a and ROM 11c that stores data such as programs to be executed by the CPU 11a. In addition, the computational processing unit 11 is provided with non-volatile memory 11d which is rewritable and capable of retaining data even if the power supply is cut off, and an interface 11e that controls each unit such as the communication unit 13 connected to the computational processing unit 11.

The non-volatile memory 11d is configured using battery-backed SRAM or flash memory, for example, and the non-volatile memory 11d stores data such as correspondence information that associates information about files and files to each other. Also, in addition to storing information related to files and the like, the secondary storage 12 also stores programs to be executed by the computational processing unit 11. In the exemplary embodiment, the processes of the server device 10 are executed by causing the computational processing unit 11 to load a program stored in the secondary storage 12. Note that the computational processing unit 11, the secondary storage 12, and the communication unit 13 are connected through a bus or signal lines.

The server device 10 executes processes such as acquiring a new file, performing file extraction, associating files with each other, and applying the updated content of a file in response to requests and the like from the terminal devices 20. Additionally, the server device 10 provides various information such as files, the results of search processes, and update information to the terminal devices 20 in response to requests and the like from the terminal devices 20. In the exemplary embodiment, the secondary storage 12 stores information related to files and the like. Also, the communication unit 13 receives requests and the like from the terminal devices 20 and transmits requested files and the like.

A program to be executed by the CPU 11a provided in the server device 10 may be provided to the server device 10 in a recorded state on a computer-readable recording medium, such as a magnetic recording medium (such as magnetic tape or a magnetic disk), an optical recording medium (such as an optical disc), a magneto-optical recording medium, or semiconductor memory. A program to be executed by the CPU 11a may also be provided to the server device 10 by using a means of communication such as the Internet.

Figure 3:
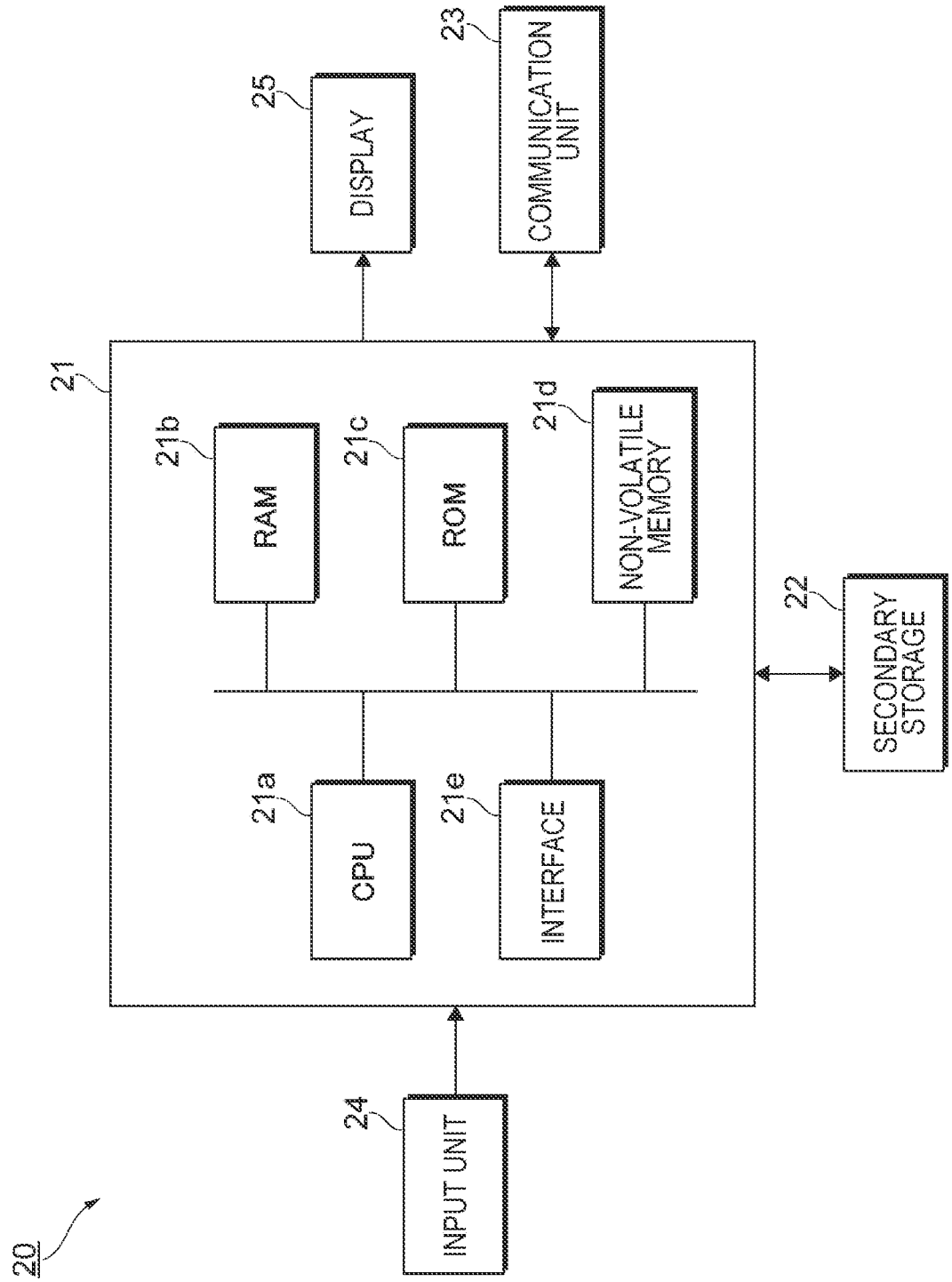
FIG. 3 is a block diagram illustrating an example of a hardware configuration of a terminal device.

Next, a hardware configuration of the terminal device 20 will be described. FIG. 3 is a block diagram illustrating an example of a hardware configuration of the terminal device 20. Each terminal device 20 according to the exemplary embodiment includes a computational processing unit 21 that executes processing for displaying images according to a program, secondary storage 22 in which information related to files and the like is recorded, and a communication unit 23 that transmits and receives information over the communication network 80 (see FIG. 1).

Also, each terminal device 20 includes an input unit 24 that receives input operations from a user and a display 25 that displays images, text information, and the like to a user. The display 25 may be a liquid crystal display (LCD) panel or an organic light-emitting diode (OLED) display panel, for example. The secondary storage 22 is realized by an existing information storage device such as a hard disk drive (HDD), semiconductor memory, or magnetic tape, for example.

The computational processing unit 21 is provided with a CPU 21a as one example of a processor. The CPU 21a controls the terminal device 20 as a whole. The computational processing unit 21 is also provided with RAM 21b used as a working memory of the CPU 21a and ROM 21c that stores data such as programs to be executed by the CPU 21a. In addition, the computational processing unit 21 is provided with non-volatile memory 21d which is rewritable and capable of retaining data even if the power supply is cut off, and an interface 21e that controls each unit such as the communication unit 23 connected to the computational processing unit 21.

The non-volatile memory 21d is configured using battery-backed SRAM or flash memory, for example, and stores data such as files and update information. Also, in addition to storing information related to files and the like, the secondary storage 22 also stores programs to be executed by the computational processing unit 21. The processes of the terminal device 20 are executed by causing the computational processing unit 21 to load a program stored in the secondary storage 22. Note that the computational processing unit 21, the secondary storage 22, and the communication unit 23 are connected through a bus or signal lines.

The input unit 24 is a pointing device or the like that the user operates when inputting information. For example, in the case where the input unit 24 is a mouse, the user performs operations for moving a cursor and click operations to thereby specify a position on display screen displayed on the display 25, specify an image displayed on the display 25, and move the specified image. Also, in the case where the input unit 24 is a touch panel, the user performs operations that involve touching the touch panel with a finger or the like and operations that involve moving the finger while touching the touch panel. With this arrangement, the user is able to specify a position on display screen displayed on the display 25, specify an image displayed on the display 25, and move the specified image.

Note that a touch panel may be provided in the terminal device 20 in some cases, and in such cases, the input unit 24 and the display 25 are provided as a unified component. Additionally, besides the pointing device or the like described above, the input unit 24 may also be a keyboard used to perform input operations via keys.

A program to be executed by the CPU 21a provided in the terminal device 20 may be provided to the terminal device 20 in a recorded state on a computer-readable recording medium, such as a magnetic recording medium (such as magnetic tape or a magnetic disk), an optical recording medium (such as an optical disc), a magneto-optical recording medium, or semiconductor memory. A program to be executed by the CPU 21a may also be provided to the terminal device 20 by using a means of communication such as the Internet.

In the exemplary embodiment, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

Also, the term "processor" is broad enough to encompass one processor or plural processors in collaboration which are located physically apart from each other but may work cooperatively. The order of operations of the processor is not limited to one described in the exemplary embodiment, and may be changed.

<Display on Display 25>

Next, the display on the display 25 provided in the terminal device 20 will be described using FIG. 4 (a diagram illustrating a display example on a display). In the exemplary embodiment, information to be used to control the display on the display 25 provided in the terminal device 20 is generated by the CPU 11a (see FIG. 2) provided as an example of a processor in the server device 10. Thereafter, the terminal device 20 controls the display according to the information. With this arrangement, the various screens described hereinafter are displayed on the display 25 of the terminal device 20. Note that the information to be used to control the display on the display 25 of the terminal device 20 may also be generated by the terminal device 20 rather than the server device 10. Moreover, one portion of the information to be used for control may be generated by the server device 10 and another portion may be generated by the terminal device 20.

Figure 4:
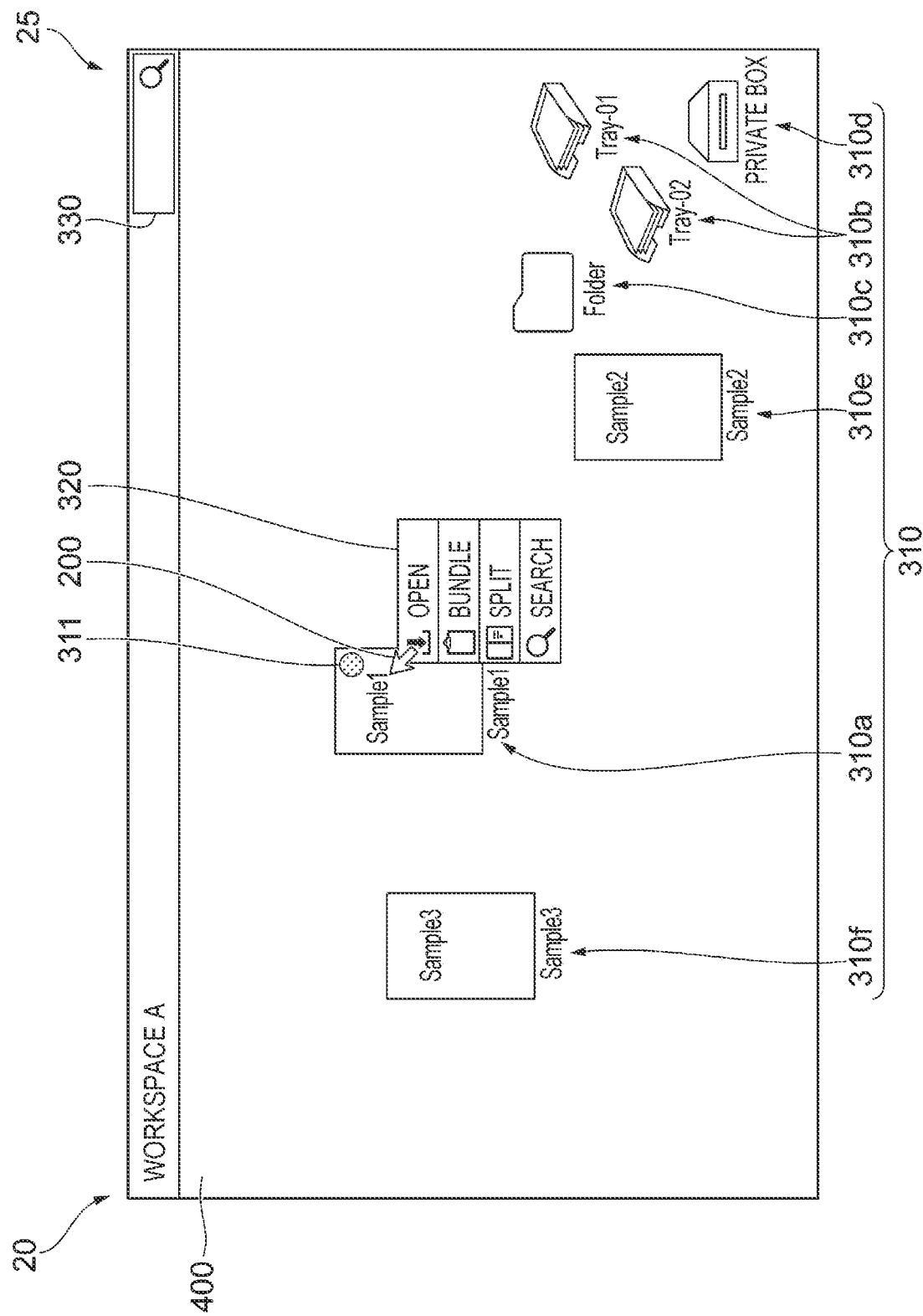
FIG. 4 is a diagram illustrating a display example on a display.

As illustrated in FIG. 4, in the exemplary embodiment, a workspace 400 of what is called file handling software is displayed on the display 25 provided in the terminal device 20. The file handling software is software that manages electronically converted files and has a function of facilitating integrated management of paper and electronic documents. Furthermore, the display 25 displays a cursor 200 that indicates the user operation location on the display 25. The cursor 200, which is given as one example of a pointer image, moves according to mouse operations performed by the user. The user moves the cursor 200 to a desired position on the display 25 and selects an element displayed on the display 25.

Also, in the exemplary embodiment, multiple icons 310 are displayed in the workspace 400 displayed on the display 25. Furthermore, in the exemplary embodiment, an enlarge button image 311 for receiving an enlargement instruction from the user is displayed on some of the icons 310.

In the exemplary embodiment, if the user moves the cursor 200 onto an icon 310, the enlarge button image 311 is displayed on the icon 310. Also, in the exemplary embodiment, if the cursor 200 moves off the icon 310, the enlarge button image 311 is hidden. Also, besides the icons 310, a context menu 320 and a search box 330 are displayed on the display 25.

The context menu 320 is an image for receiving instructions from the user. In the exemplary embodiment, the context menu 320 is displayed if a right-click is performed after positioning the cursor 200 over an icon 310, for example. Selectable options are displayed in the context menu 320. In the exemplary embodiment, the user chooses an option from among the selectable options to thereby execute a process corresponding to the chosen option.

The search box 330 is an image for receiving a search from the user. In the exemplary embodiment, a character string is inputted into the search box 330. If a character string is inputted into the search box 330, a search process using the inputted character string is executed with respect to the files in the workspace 400 displayed on the display 25, for example. Note that the range of the search process is not limited to only the workspace 400 displayed on the display 25, and other workspaces 400 or all files stored in the server device 10 and the terminal device 20 may also be included in the range of the search process.

The icons 310 are images displayed on the display 25 in correspondence with each of user-selectable elements. A picture, symbol, character information, or the like is displayed in the icons 310. Each of the icons 310 may also be considered to be a thumbnail image. In the display example illustrated in FIG. 4, a workspace A is displayed as the workspace 400, and multiple icons 310 are displayed in the workspace A.

In the exemplary embodiment, a first file icon 310a, a second file icon 310e, and a third file icon 310f respectively corresponding to files with the file names "Sample1", "Sample2", and "Sample3" are displayed as the icons 310. Also, tray icons 310b respectively corresponding to trays with the tray names "Tray-01" and "Tray-02", a folder icon 310c corresponding to a folder, and a private box icon 310d corresponding to a private box are displayed in the workspace A.

Each of the first file icon 310a, second file icon 310e, and third file icon 310f given as examples of file images is an image that corresponds to and represents a file. The first file icon 310a, second file icon 310e, and third file icon 310f are configured as images that represent the content of a file using a picture, a symbol, or character information, for example. In the case where the files corresponding to the first file icon 310a, second file icon 310e, and third file icon 310f contain image data, a reduced version of the image expressed by the image data is displayed as the file icon, for example.

As another example, in the case where the files corresponding to the first file icon 310a, second file icon 310e, and third file icon 310f contain multi-page documents, a reduced version of an image on a representative page, such as first page, is displayed as the file icon, for example. Additionally, the first file icon 310a, second file icon 310e, and third file icon 310f function as icons for opening the corresponding files.

The tray icons 310*b* are icons corresponding to tray that contain files, and when selecting a tray, the user selects the corresponding tray icon. The folder icon 310*c* is an icon corresponding to a folder that contains files, and when selecting a folder, the user selects the folder icon.

The private box icon 310*d* is an icon provided to every user who operates the terminal device 20. In the exemplary embodiment, files provided by a third party to the user who operates the terminal device 20 are stored in an information storage area corresponding to the private box icon 310*d*. When referencing a file stored in the information storage area, the user selects the private box icon 310*d*.

The enlarge button image 311, which is one example of a button image, is an image for receiving, from the user, an instruction related to the display of an enlarged image 360 described later. In FIG. 4, the enlarge button image 311 is displayed in association with the first file icon 310*a*. The enlarge button image 311 displayed in FIG. 4 is an image for receiving, from the user, an instruction for displaying the enlarged image 360 (described later) corresponding to the first file icon 310*a* with the file name "Sample1".

As described later, in the exemplary embodiment, if the enlarge button image 311 is selected by the user, the enlarged image 360 (see FIG. 5) which corresponds to the first file icon 310*a* on which the enlarge button image 311 is displayed and which is an image having a larger display size than the first file icon 310*a* is displayed.

In the exemplary embodiment, an instruction for temporarily displaying the enlarged image 360 is received on the basis of a user operation performed on the enlarge button image 311. In the exemplary embodiment, if a mouseover operation is performed on the enlarge button image 311, the operation is received as an operation for temporarily displaying the enlarged image 360. The enlarged image 360 is displayed while the mouseover operation continues, and the enlarged image 360 is hidden if the mouseover operation ends.

In the exemplary embodiment, the enlarge button image 311 is displayed in the upper-right corner of the first file icon 310*a*. Also, in the exemplary embodiment, the display size of the enlarge button image 311 is smaller than the display size of the first file icon 310*a*.

Note that besides the above, the enlarge button image 311 may also be semitransparent such that the portion of the first file icon 310*a* that is positioned behind the enlarge button image 311 is visible through the enlarge button image 311. In addition, the enlarge button image 311 may also be displayed in association with not only the first file icon 310*a* but also other icons, such as the second file icon 310*e*, the third file icon 310*f*, the tray icons 310*b*, the folder icon 310*c*, and the private box icon 310*d*. In this case, the enlarged image 360 may be displayed with respect to the other icons, too.

Figure 5:
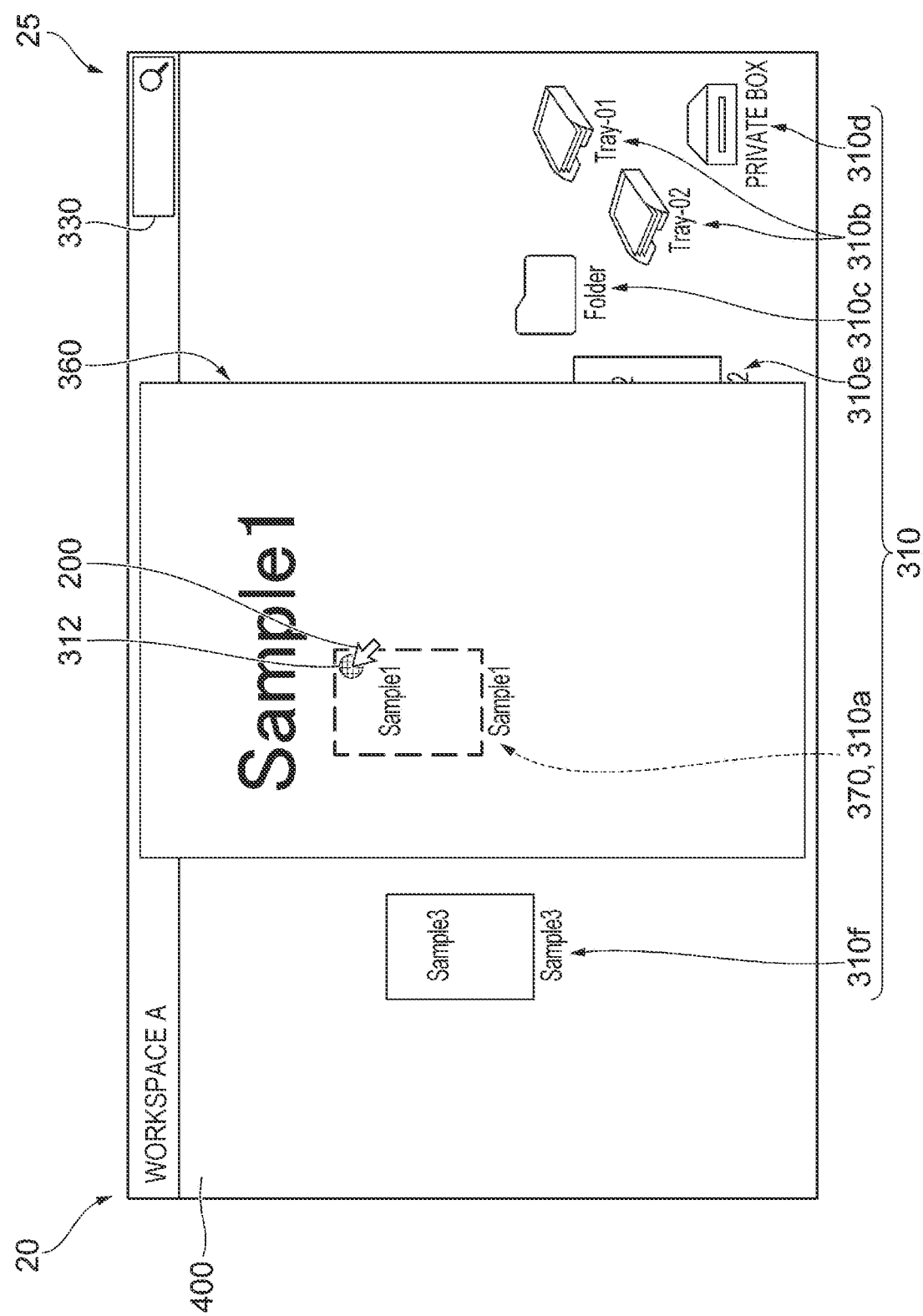
FIG. 5 is a diagram illustrating the state of a display when a mouseover is performed on an enlarge button image of a first file icon.

FIG. 5 is a diagram illustrating the state of the display 25 when a mouseover is performed on the enlarge button image 311 of the first file icon 310*a*. Here, in FIG. 5, the enlarged image 360 corresponding to the first file icon 310*a* is displayed as described above.

In the present exemplary embodiment, as illustrated in FIG. 5, if the first file icon 310*a* corresponding to "Sample1" is selected, the enlarged image 360 which corresponds to the first file icon 310*a* and which has a larger display size than the first file icon 310*a* is displayed on the display 25. More specifically, in the exemplary embodiment, if a mouseover or the like is performed on the enlarge button image 311 displayed in association with the first file icon 310*a*, the enlarged image 360 having a larger display size than the first file icon 310*a* is displayed on the display 25.

Here, a "having a larger display size" is synonymous with having a larger display area. Note that hereinafter in this specification, "having a larger display size" similarly refers to having a larger display area. Also, "having a smaller display size" refers to having a smaller display area.

In the exemplary embodiment, the enlarged image 360 is displayed at a central position in the workspace 400 displayed on the display 25, and also at a higher level (toward the user) than the display level of the first file icon 310*a* from which the display of the enlarged image 360 originates. As another example, in the case where the icon 310 from which the display of the enlarged image 360 originates is displayed at a position close to the edge of the workspace 400 displayed on the display 25, the enlarged image 360 may be displayed near the icon 310. The enlarged image 360 may also be displayed in a location adjacent to the icon 310. Also, with respect to the margins on each of the left and right sides of the icon 310, the enlarged image 360 may be displayed on the side with the larger margin.

In this way, in the exemplary embodiment, if a mouseover is performed on the enlarge button image 311 of the first file icon 310*a*, the enlarged image 360 corresponding to the first file icon 310*a* with the enlarge button image 311 displayed thereon is displayed.

In the exemplary embodiment, the shape of the first file icon 310*a* and the shape of the enlarged image 360 are similar to each other. Note that the configuration is not limited to an appearance like the above, and content different from the display content of the first file icon 310*a* may also be displayed in the enlarged image 360. Moreover, the shape of the enlarged image 360 and the shape of the first file icon 310*a* may be dissimilar to each other. In the exemplary embodiment, the "enlarged image 360" refers to an image having a larger display size than the first file icon 310*a* given as one example of a selected file image. Even if an image has a different shape from the first file icon 310*a*, the image still corresponds to the enlarged image 360 if the image has a larger display size than the first file icon 310*a*.

Furthermore, in the exemplary embodiment, as illustrated in FIG. 5, if the first file icon 310*a* from which the display of the enlarged image 360 originates is positioned behind the enlarged image 360, a corresponding image 370 indicating information that corresponds to the first file icon 310*a* selected by the user is displayed. At this point, "the first file icon 310*a* . . . is positioned behind the enlarged image 360" means that the area where the first file icon 310*a* was displayed overlaps at least partially with the area where the enlarged image 360 is displayed. Specifically, in the exemplary embodiment, if the first file icon 310*a* selected by the user is obscured due to the display of the enlarged image 360, the corresponding image 370 is displayed to display information about the first file icon 310*a* selected by the user.

The corresponding image 370 given as one example of a file-corresponding image is an image that corresponds to the file represented by the first file icon 310*a* from which the display of the enlarged image 360 originates. In the exemplary embodiment, a character image indicating the file name "Sample1" is displayed as a portion of the corresponding image 370. Also, in the exemplary embodiment, the corresponding image 370 is displayed in the location where the first file icon 310*a* selected by the user was displayed.

The corresponding image 370 may be the same image as the first file icon 310*a* or an image in which at least one of the shape, display size, color, or content is different from the first file icon 310*a*. In the exemplary embodiment, the corresponding image 370 is an image obtained by applying transparency to the image of the first file icon 310*a*.

In the display example illustrated in FIG. 5, a maintain button image 312 for receiving, from the user, an instruction related to the display of the enlarged image 360 is additionally displayed. The maintain button image 312 given as one example of a button image is displayed when the enlarged image 360 is displayed. Also, the maintain button image 312 is displayed to receive, from the user, an instruction for maintaining the display of the enlarged image 360. In FIG. 5, the maintain button image 312 is displayed in the location where the enlarge button image 311 (see FIG. 4) was displayed. Note that the maintain button image 312 may also be semitransparent such that the portion of the enlarged image 360 that is positioned behind the maintain button image 312 is visible through the maintain button image 312.

The maintain button image 312 is an image for receiving, from the user, an instruction for maintaining the display of the enlarged image 360 corresponding to the first file icon 310*a* with the file name "Sample1". Note that the maintain button image 312 may also be displayed in a different location from the location where the enlarge button image 311 was displayed, and the display position of the maintain button image 312 is not particularly limited. Moreover, the maintain button image 312 may also be added to the display without hiding the enlarge button image 311.

Figure 6:
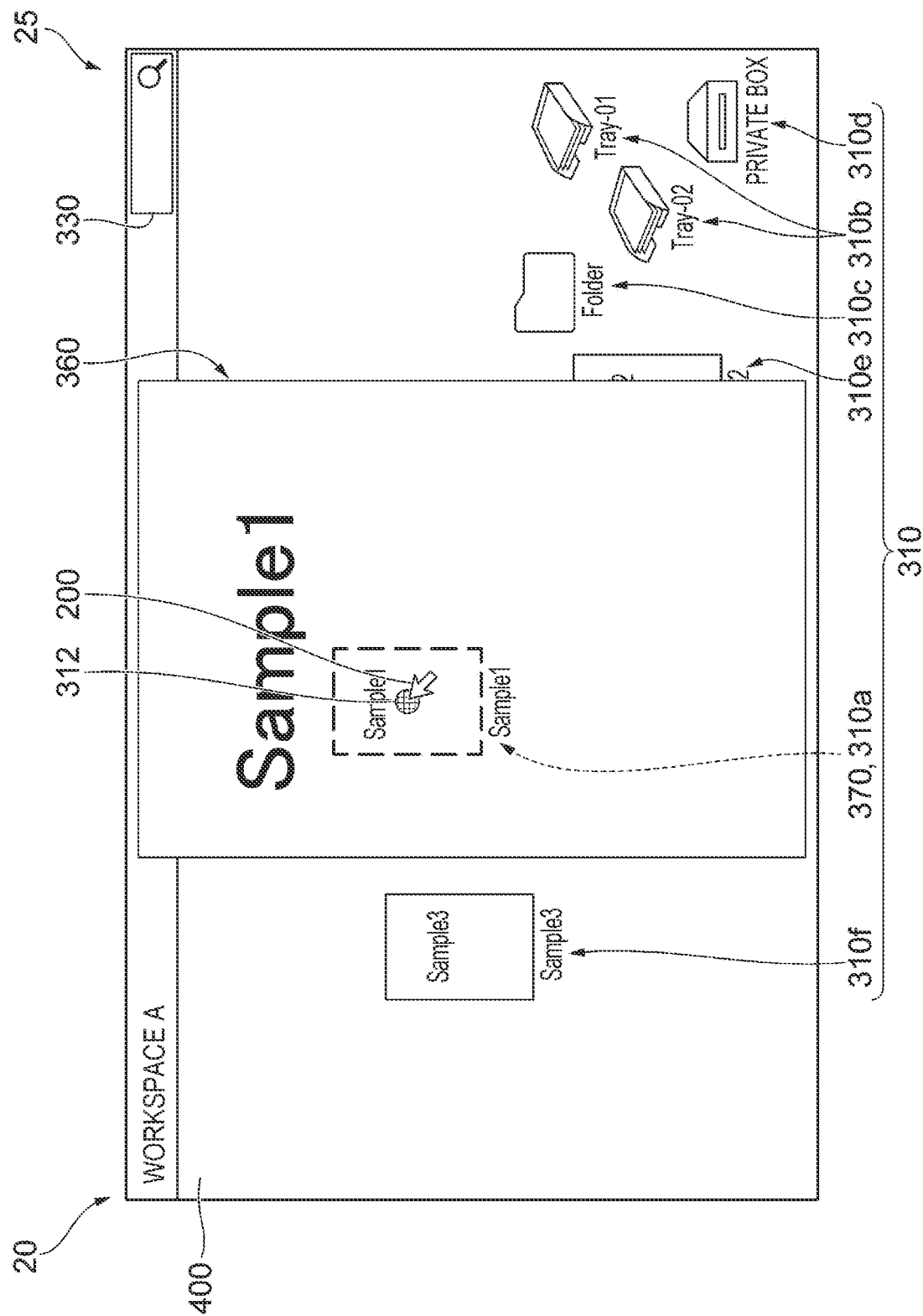
FIG. 6 is a diagram illustrating another display example on a display.

In the present exemplary embodiment, the display location of the maintain button image 312 is changed as illustrated in FIG. 6 from the location where the enlarge button image 311 was displayed (see FIG. 4), depending on the movement of the cursor 200. In the present exemplary embodiment, the display location of the maintain button image 312 is changed such that the maintain button image 312 moves together with the cursor 200, which is one example of a pointer image. If the maintain button image 312 moves together with the cursor 200 like in the present exemplary embodiment, usability is improved when the user selects the maintain button image 312.

Also, in the present exemplary embodiment, the display location of the maintain button image 312 satisfying a specific condition is changed such that the maintain button image 312 moves together with the cursor 200. On the other hand, the display location of the maintain button image 312 not satisfying the specific condition does not have to be changed. More specifically, the display location of the maintain button image 312 displayed in an overlapping state with the enlarged image 360 is changed such that the maintain button image 312 moves together with the cursor 200. On the other hand, the display location of the maintain button image 312 displayed in a non-overlapping state with the enlarged image 360 does not have to be changed. If the maintain button image 312 moves together with the cursor 200 like in the present exemplary embodiment, the portion of the enlarged image 360 that was positioned behind the maintain button image 312 before the display location of the maintain button image 312 is changed may be displayed clearly. Note that instead of changing the display location, the maintain button image 312 may also be hidden temporarily or the transparency level may be changed.

In the present exemplary embodiment, the user may click the maintain button image 312, and if the maintain button image 312 is clicked, the display of the enlarged image 360 is maintained. Also, in the present exemplary embodiment, the maintain button image 312 may be clicked, and if the maintain button image 312 is clicked, the display of the enlarged image 360 is maintained even if the cursor 200 moves off the maintain button image 312.

Figure 7:
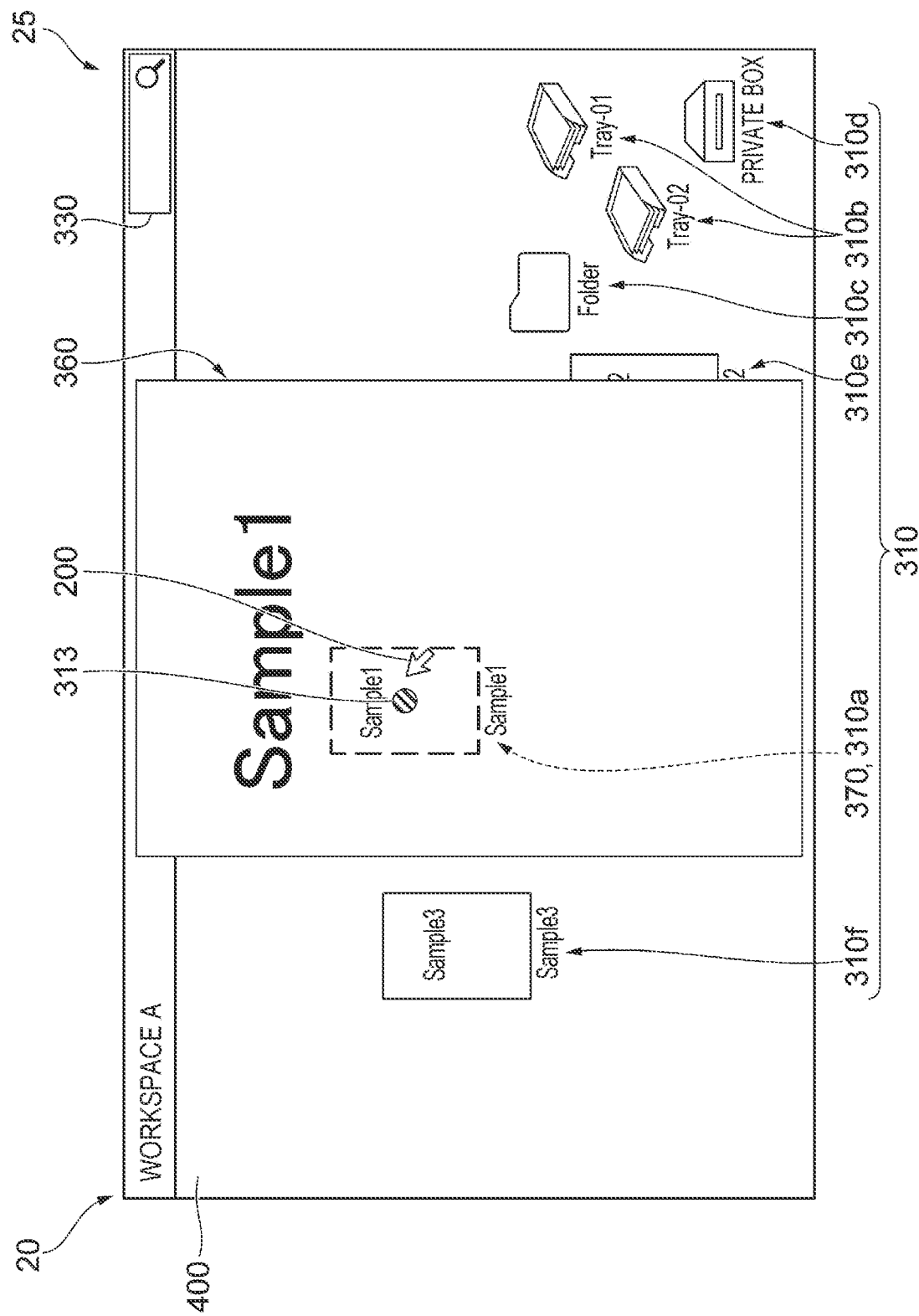
FIG. 7 is a diagram illustrating the state of a display after a maintain button image of an enlarged image is clicked.

FIG. 7 is a diagram illustrating the state of the display 25 after the maintain button image 312 of the enlarged image 360 is clicked. In the present exemplary embodiment, if the maintain button image 312 (see FIG. 6) of the enlarged image 360 is clicked, the cancel button image 313 is displayed. Also, in the present exemplary embodiment, if the maintain button image 312 is clicked, the display of the enlarged image 360 is maintained as described above. Accordingly, as illustrated in FIG. 7, even if the cursor 200 moves away from the location where the maintain button image 312 was displayed (see FIG. 6), the display of the enlarged image 360 is maintained.

The cancel button image 313 given as an example of a button image is displayed to receive, from the user, an instruction for canceling the maintaining of the display of the enlarged image 360. In FIG. 7, the cancel button image 313 is displayed in the location where the maintain button image 312 (see FIG. 6) was displayed. Note that the cancel button image 313 may also be semitransparent such that the portion of the enlarged image 360 that is positioned behind the cancel button image 313 is visible through the cancel button image 313.

The cancel button image 313 is an image for receiving, from the user, an instruction for canceling the maintaining of the display of the enlarged image 360 corresponding to the first file icon 310*a* with the file name "Sample1". Note that the cancel button image 313 may also be displayed in a different location from the location where the maintain button image 312 (see FIG. 6) was displayed, and the display position of the cancel button image 313 is not particularly limited. Moreover, the cancel button image 313 may also be added to the display without hiding the maintain button image 312. The cancel button image 313 may also move together with the cursor 200.

In the case of the present exemplary embodiment, if the user selects the cancel button image 313, the maintain button image 312 (see FIG. 5) that was hidden is displayed again. Specifically, if the user selects the cancel button image 313 from the state illustrated in FIG. 7, the display on the display 25 returns to the display illustrated in FIG. 6.

Figure 8:
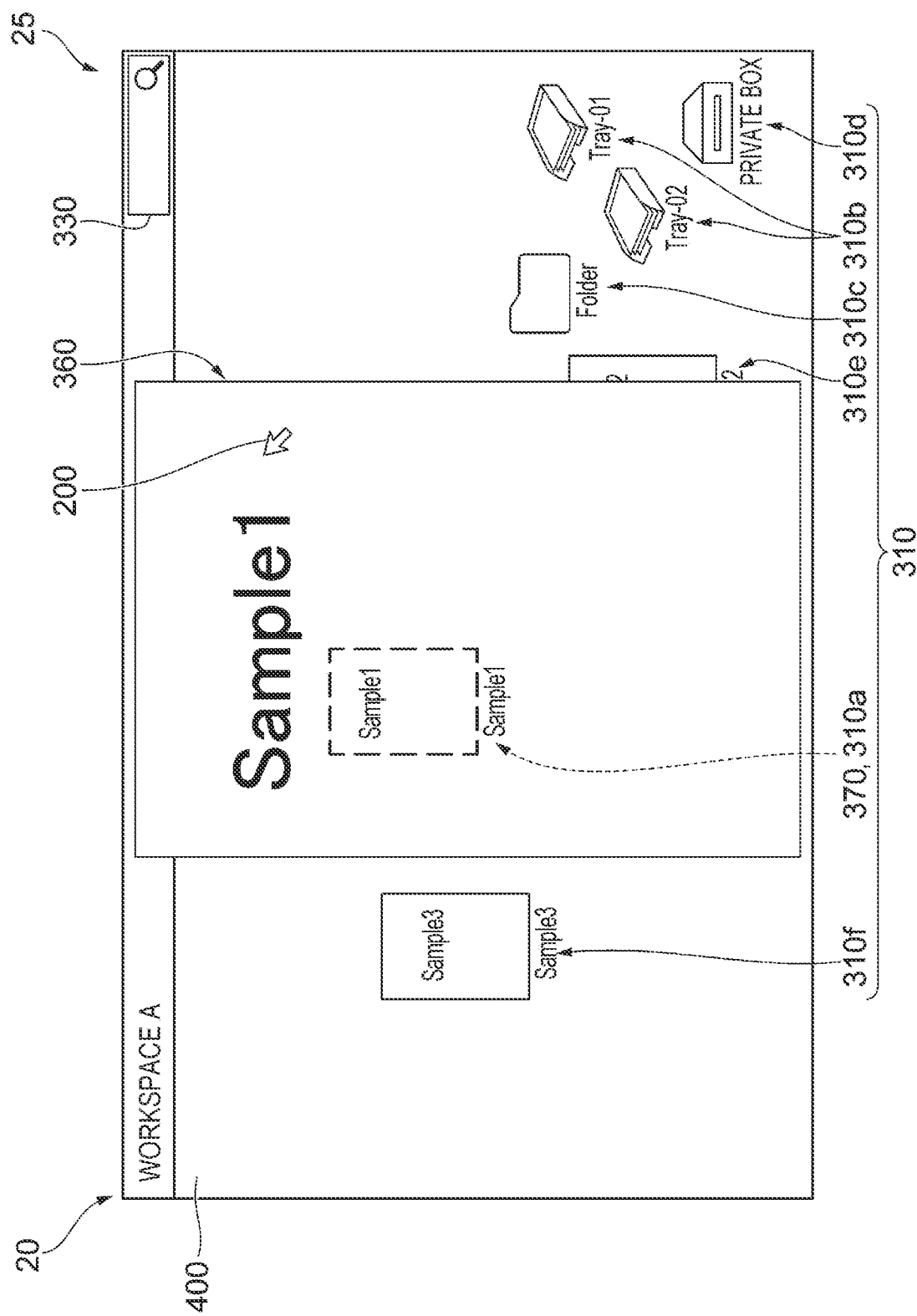
FIG. 8 is a diagram illustrating another display example on a display.

In the present exemplary embodiment, if the cursor 200 moves from the state illustrated in FIG. 7 to the state illustrated in FIG. 8, the cancel button image 313 is hidden. In the present exemplary embodiment, the cancel button image 313 is hidden if the display changes from the state illustrated in FIG. 7 in which the cursor 200 is positioned over the corresponding image 370, to the state illustrated in FIG. 8 in which the cursor 200 is away from the corresponding image 370. In other words, if the cancel button image 313 is not selected and the cursor 200 is away from the corresponding image 370, the cancel button image 313 is hidden. On the other hand, if the cursor 200 has not moved off the corresponding image 370, the display of the cancel button image 313 is maintained.

Note that in the present exemplary embodiment, the cancel button image 313 is hidden in this way if the cursor 200 moves off the corresponding image 370, but the display of the cancel button image 313 may also be maintained even if the cursor 200 moves off the corresponding image 370. Additionally, for example, the display of the cancel button image 313 may be maintained if the cursor 200 is positioned in the display area of the enlarged image 360, and hidden if the cursor 200 moves out of the display area of the enlarged image 360.

Figure 9:
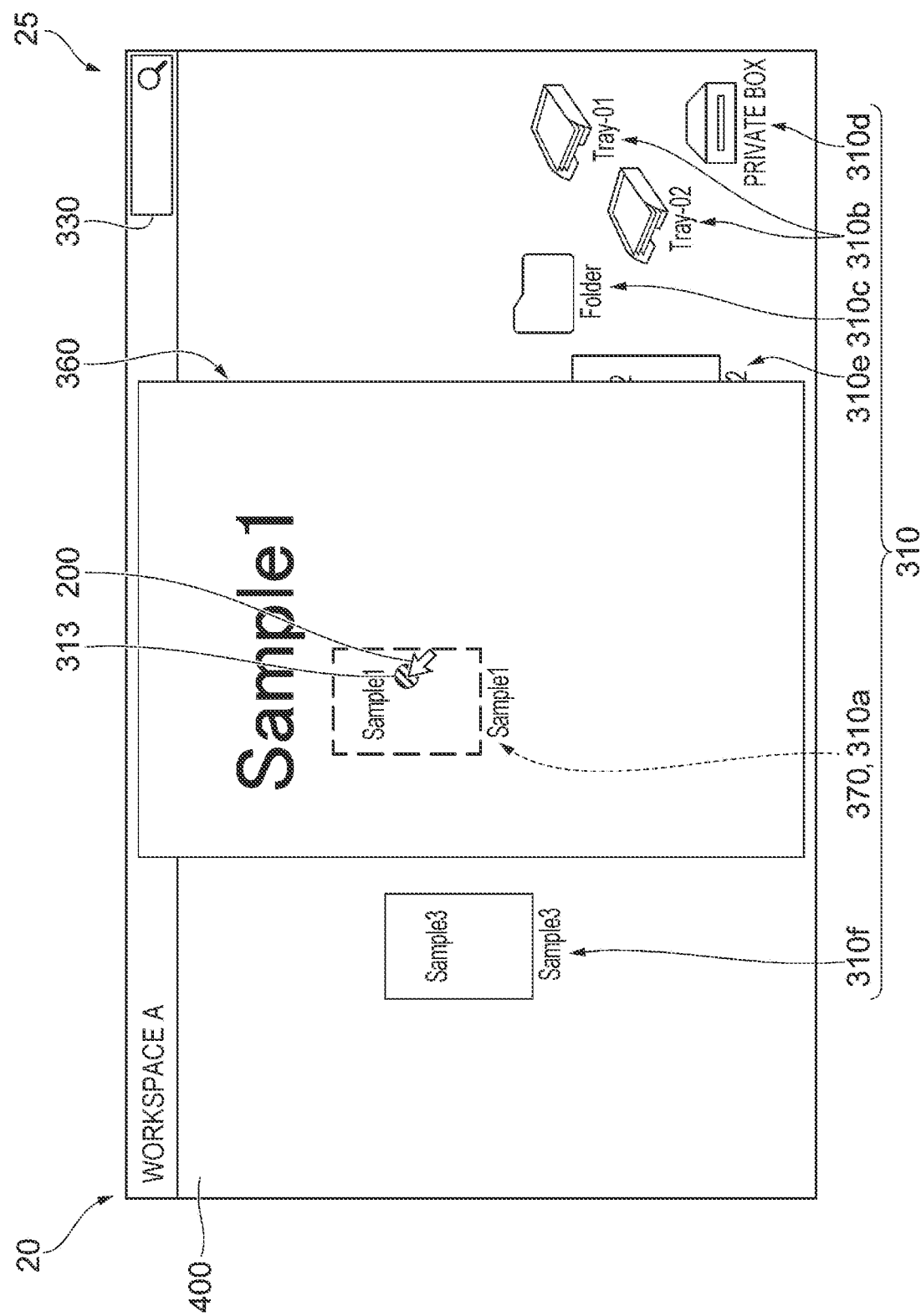
FIG. 9 is a diagram illustrating another display example on a display.

In the present exemplary embodiment, if the cursor 200 that has moved off the corresponding image 370 (see FIG. 8) goes back over the corresponding image 370, the cancel button image 313 that was hidden is displayed again, as illustrated in FIG. 9. In the present exemplary embodiment, the cancel button image 313 that is displayed again when the cursor 200 goes back over the corresponding image 370 moves together with the cursor 200. Note that the cancel button image 313 may also not move together with the cursor 200, and may be displayed again at a predetermined location on the corresponding image 370.

Figure 10:
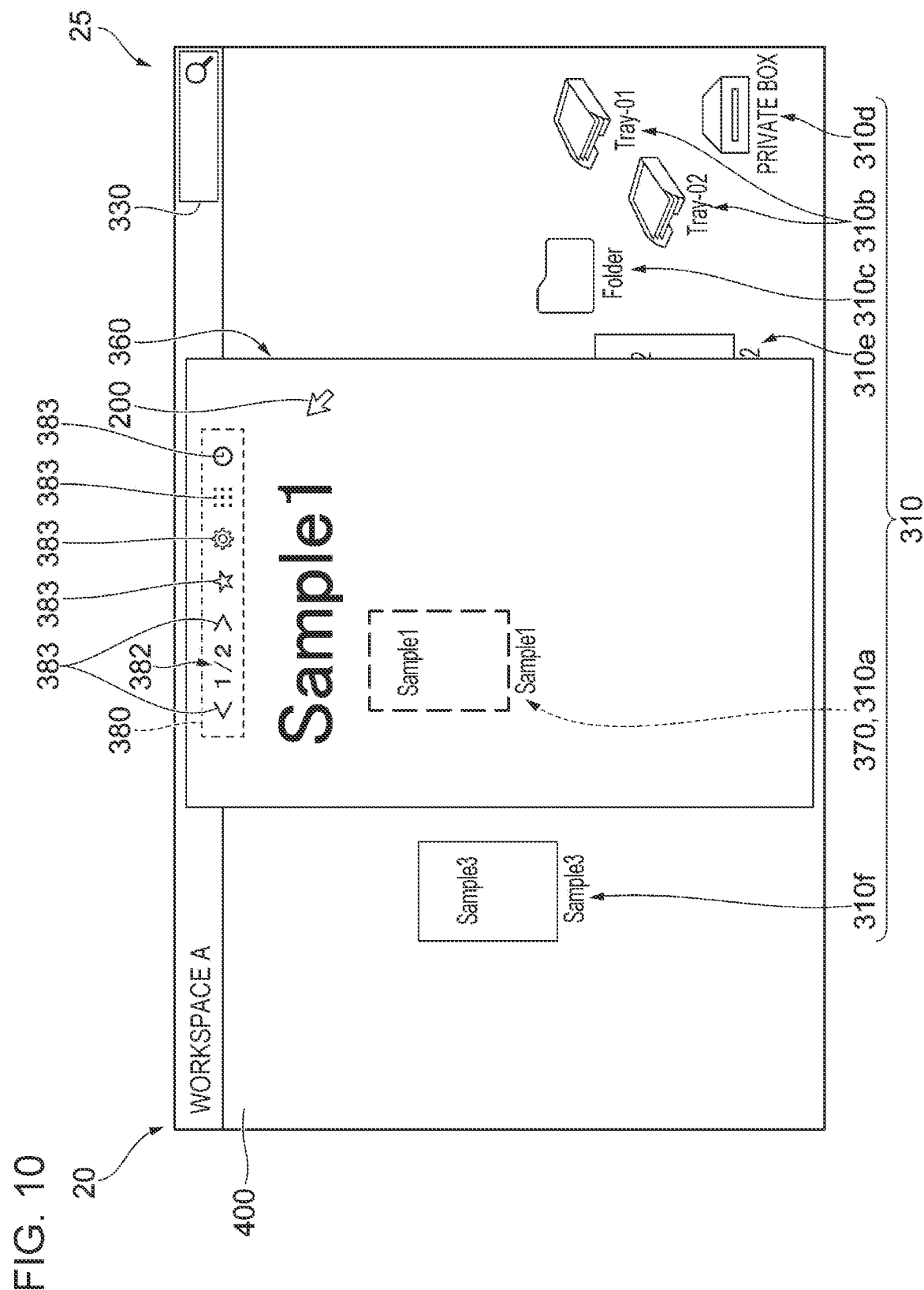
FIG. 10 is a diagram illustrating the state of a display when a cursor is moved off a corresponding image and positioned over an enlarged image.

FIG. 10 is a diagram illustrating the state of the display 25 when the cursor 200 is moved off the corresponding image 370 and positioned over the enlarged image 360. In the display example in FIG. 10, a menu bar 380 for receiving user operations with respect to the enlarged image 360 is displayed. In the present exemplary embodiment, the menu bar 380 is displayed if the cursor 200 moves off the corresponding image 370. The menu bar 380, which is one example of a reception image, is an image for receiving user operations on the file corresponding to the enlarged image 360. In the present exemplary embodiment, the menu bar 380 is displayed if the cursor 200 is positioned in the portion of the enlarged image 360 that is not overlapping with the corresponding image 370.

In the case of the present exemplary embodiment, the menu bar 380 is displayed at a position that does not readily obstruct the user's view of the enlarged image 360. The display size of the menu bar 380 is not particularly limited, but preferably is a size enabling the user to see individual menu images 383 corresponding to menu options, while also being a size that does not readily obstruct the display of the enlarged image 360. Note that the display size and shape of the menu bar 380 does not have to be uniform and may also be changed to fit the display 25 and the display size and shape of the enlarged image 360.

On the menu bar 380, a page display field 382 for displaying the number of pages in the file and menu images 383 corresponding to various menu options are displayed. Examples of the menu images 383, which are examples of a reception image, include images for changing the displayed page and editing the file. In the present exemplary embodiment, file editing work may be carried out by performing operations on the menu images 383. Specific examples of editing work include inputting text and adding label images or stamp images.

Other examples of the menu images 383 include an image for causing a history of edits to the file to be displayed. Other examples of the menu images 383 include an image for receiving a user operation for enlarging the display area of the menu bar 380. If additional images are made to be displayed as the display area of the menu bar 380 is enlarged, the user is able to perform other types of operations. Otherwise, images for receiving operations such as transmitting the file to another user or the like may also be displayed on the menu bar 380.

In the display example in FIG. 10, the cursor 200 is positioned over the enlarged image 360, but is not positioned over the menu bar 380. In other words, the display example in FIG. 10 illustrates a state in which the menu bar 380 is not be specified by the user. In this state, in the present exemplary embodiment, the transparency level of the menu bar 380 is set to semitransparent such that the portion of the enlarged image 360 that overlaps with the menu bar 380 is visible through the menu bar 380.

Figure 11:
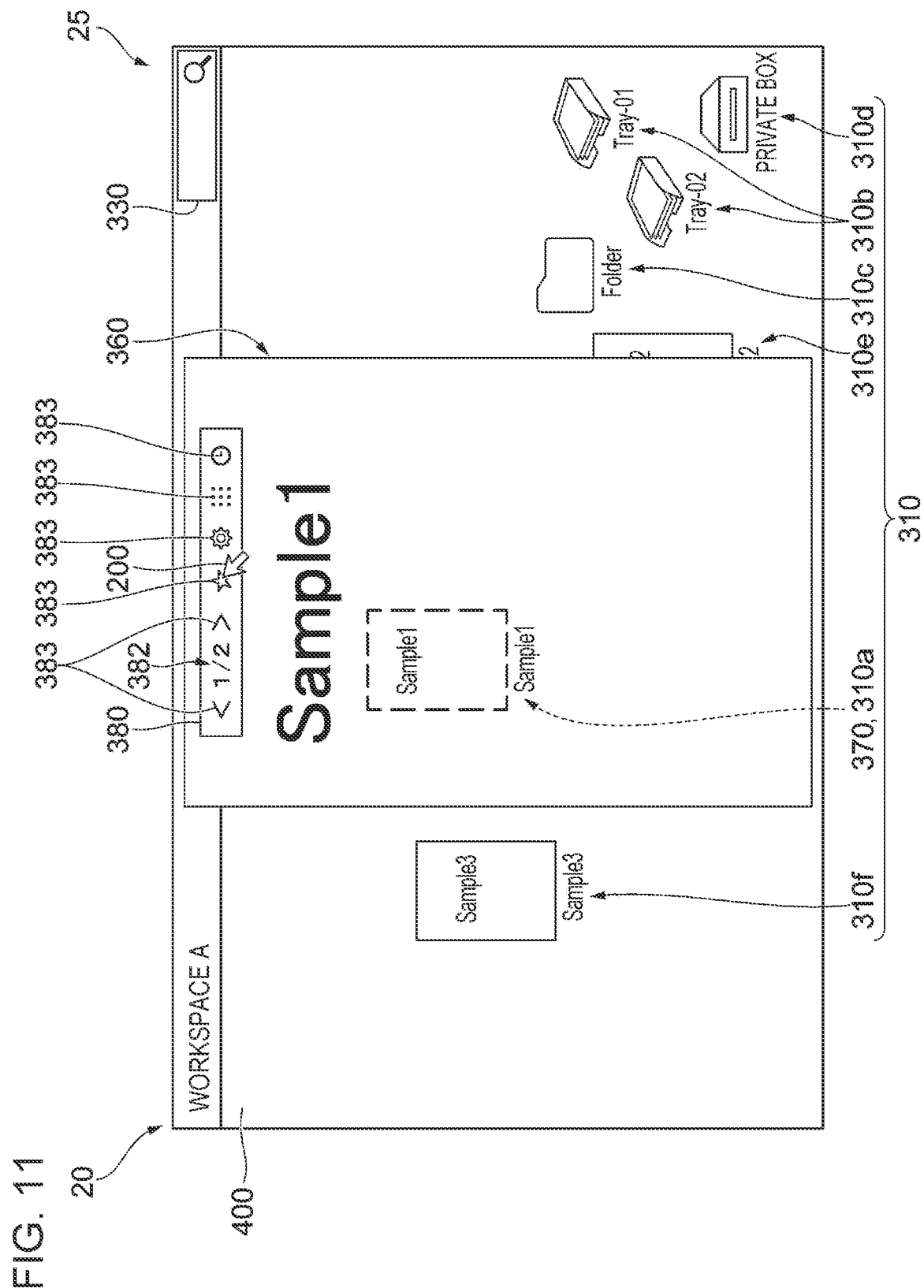
FIG. 11 is a diagram illustrating another display example on a display.

On the other hand, in the state in which the cursor 200 is positioned over the menu bar 380, as illustrated in FIG. 11, a process for lowering the transparency level of the menu bar 380 is performed. In other words, in the state in which the cursor 200 exists over the enlarged image 360 and the menu bar 380 is being specified by the user, as illustrated in FIG. 11, a process for lowering the transparency level of the menu bar 380 is performed. With this arrangement, the menu images 383 on the menu bar 380 are displayed more clearly.

Figure 12:
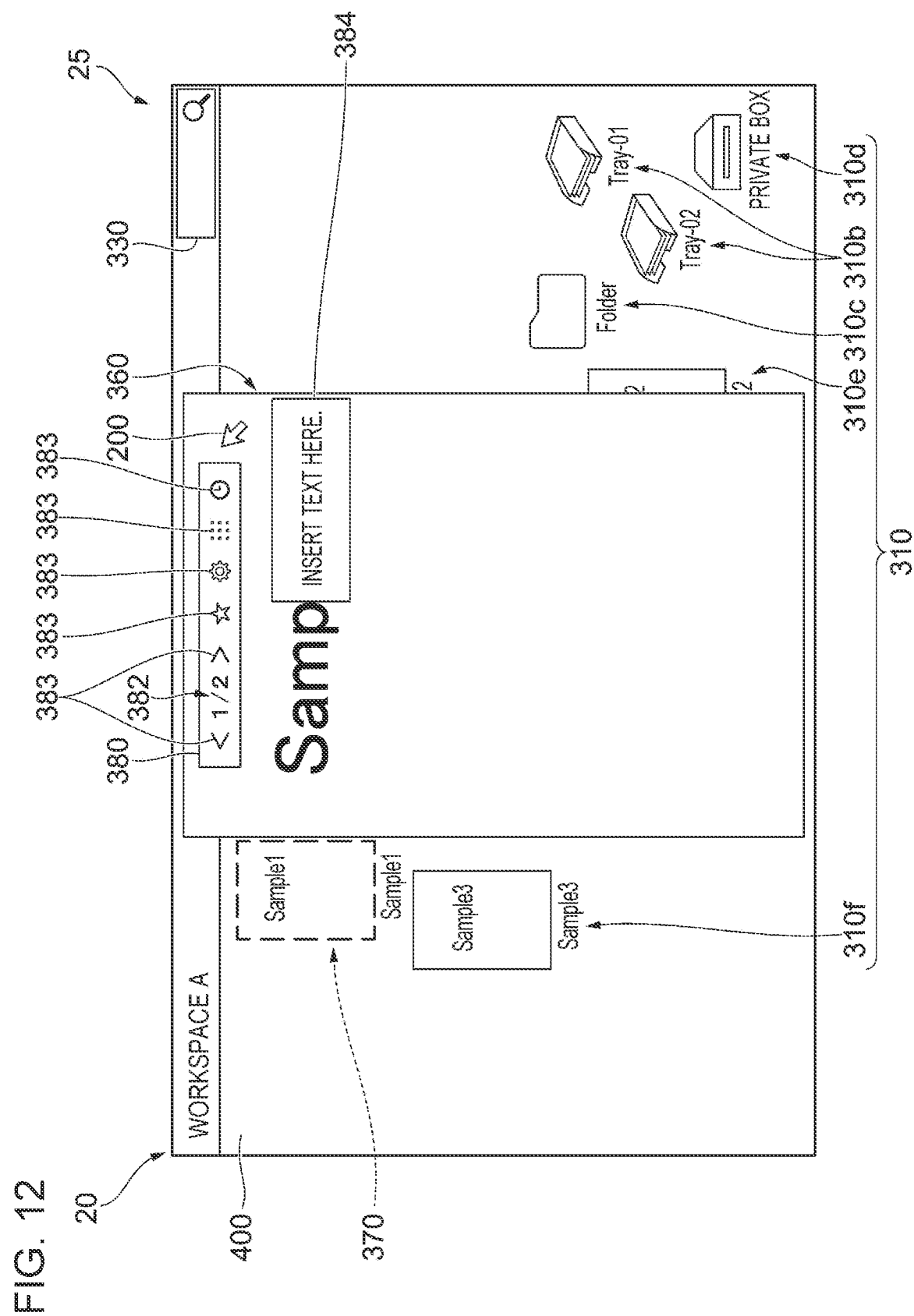
FIG. 12 is a diagram illustrating the state of a display when a user operation is performed with respect to a menu image on a menu bar.

FIG. 12 is a diagram illustrating the state of the display 25 when a user operation is performed with respect to the menu images 383 on the menu bar 380. In FIG. 12, the enlarged image 360 is displayed on the display 25 to reflect a process corresponding to the operated menu images 383.

The display example in FIG. 12 illustrates a case where one of the menu images 383 has been selected. In this display example, an area for receiving text input is displayed on the enlarged image 360 in association with the selection of one of the menu images 383, as indicated by the sign 384. Also, in the display example in FIG. 12, the display location of the corresponding image 370 is changed. Specifically, the display location of the corresponding image 370 is changed to a location away from the enlarged image 360. With this arrangement, the portion of the enlarged image 360 that was positioned behind the corresponding image 370 is displayed clearly.

Figure 13:
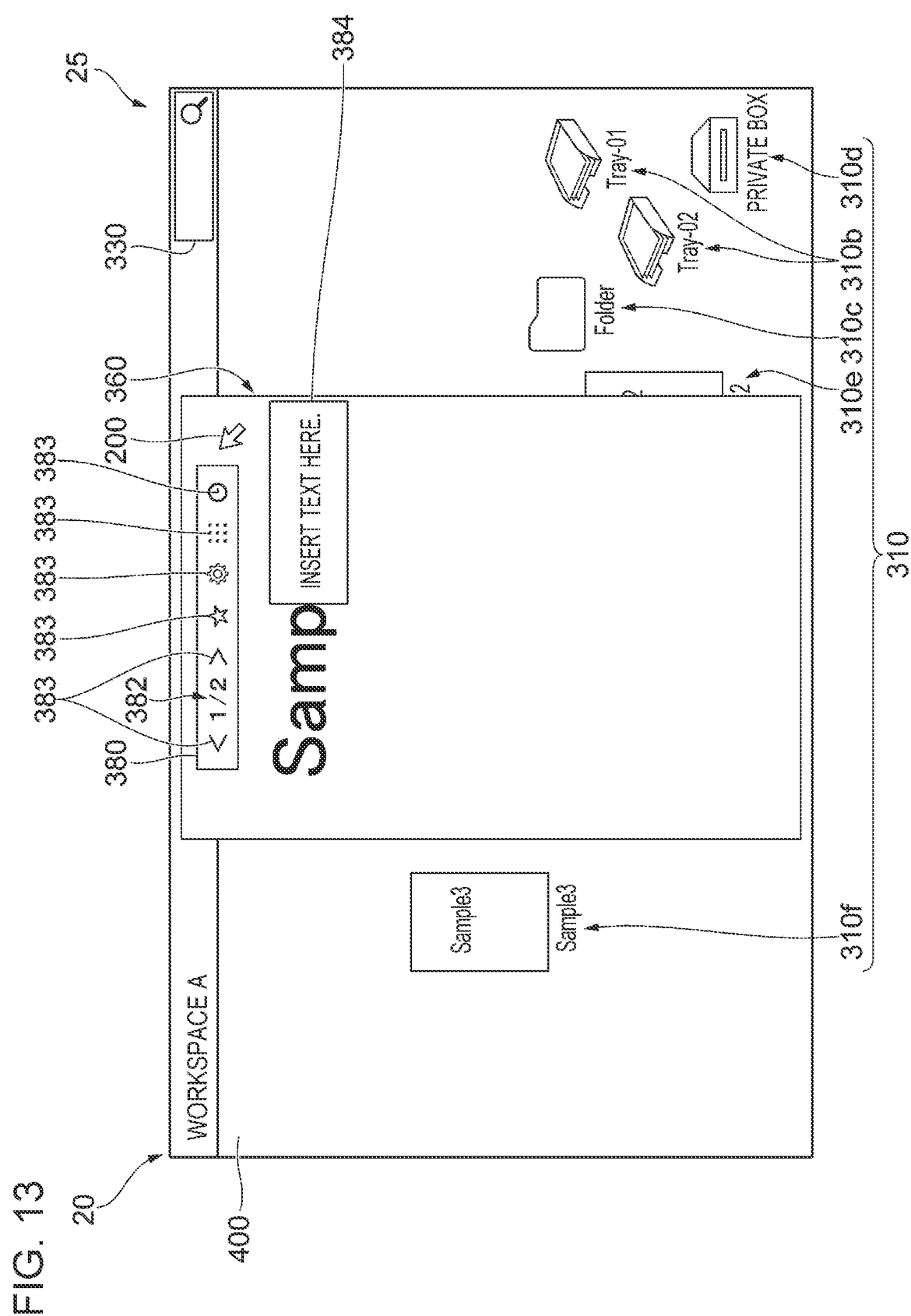
FIG. 13 is a diagram illustrating another display example on a display.

In this process example, if the user selects the menu images 383, the display location of the corresponding image 370 is changed to a location away from the enlarged image 360. In this case, the portion of the enlarged image 360 that was difficult to see due to the corresponding image 370 is seen more easily. Note that the display location of the corresponding image 370 does not have to be changed, and if the user selects the menu images 383, the corresponding image 370 may be hidden, as illustrated in FIG. 13.

In the present exemplary embodiment, the corresponding image 370 given as one example of a file-corresponding image is hidden if a predetermined condition is satisfied. As described above, one example of the predetermined condition is that the menu images 383 included on the menu bar 380 are selected by the user. Other examples of the predetermined condition include the case where the cursor 200 remains stopped for an elapsed time equal to or greater than a threshold value and the case where the user gives an instruction for hiding the corresponding image 370.

Otherwise, the display location of the corresponding image 370 may be changed or the corresponding image 370 may be hidden even if the user does not select the menu images 383 included on the menu bar 380. For example, the display location of the corresponding image 370 may be changed or the corresponding image 370 may be hidden when the user performs a mouseover on the menu bar 380. In other words, the display location of the corresponding image 370 may be changed or the corresponding image 370 may be hidden when the menu images 383 are not selected by the user, but the cursor 200 is positioned over the menu bar 380.

In the example described above, only the corresponding image 370 that corresponds to the first file icon 310a from which the display of the enlarged image 360 originates is displayed, but a corresponding image 370 that corresponds to another icon 310 different from the first file icon 310a may also be displayed. For example, if another icon 310 different from the first file icon 310a selected by the user is positioned behind the enlarged image 360, the corresponding image 370 that corresponds to the other icon 310 may also be displayed. In this case, multiple corresponding images 370 are displayed.

Figure 14:
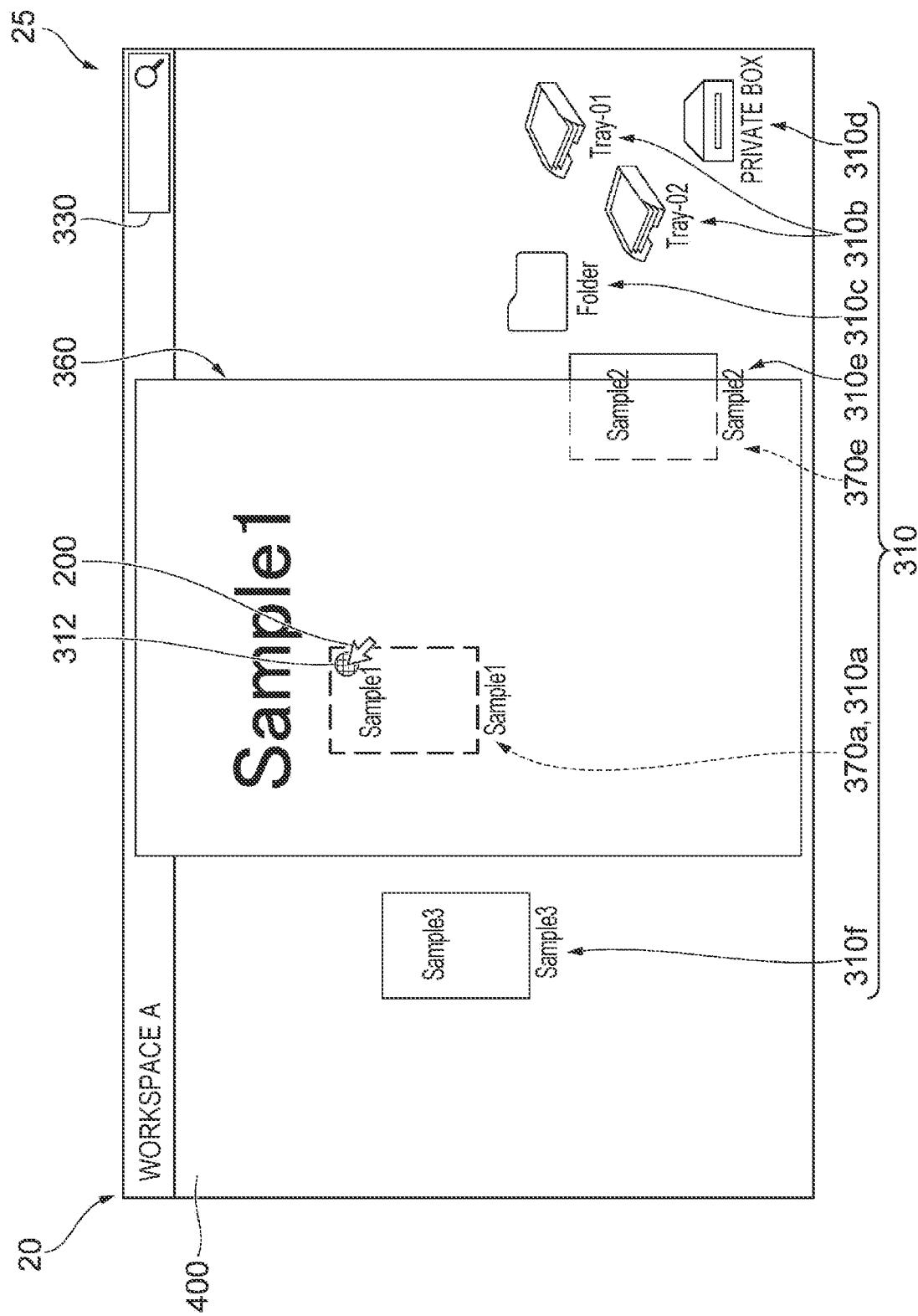
FIG. 14 is a diagram illustrating a display example on a display in the case where multiple corresponding images are displayed.

FIG. 14 is a diagram illustrating a display example on the display 25 in the case where multiple corresponding images 370 are displayed. In FIG. 14, the enlarged image 360 and corresponding images 370 (370a, 370e) are displayed on the display 25. In the display example in FIG. 14, the first file icon 310a selected by the user and a second file icon 310e are positioned behind the enlarged image 360. In this process example, corresponding images 370 are displayed for all icons 310 positioned behind the enlarged image 360. In the display example in FIG. 14, the corresponding image 370a that corresponds to the first file icon 310a selected by the user and the corresponding image 370e that corresponds to the second file icon 310e are displayed.

Note that the appearance may also be differentiated between the corresponding image 370 that corresponds to the icon 310 selected by the user and the corresponding image 370 that corresponds to the icon 310 not selected by the user. In other words, the corresponding image 370 that corresponds to the icon 310 from which the display of the enlarged image 360 originates may have a different appearance from the corresponding image 370 that corresponds to the icon 310 from which the display of the enlarged image 360 does not originate.

Specifically, for example, if the first file icon 310a is selected by the user and the enlarged image 360 is displayed, an image indicating the selection is applied to the corresponding image 370a that corresponds to the first file icon 310a. On the other hand, an image is not applied to the corresponding image 370e that corresponds to the second file icon 310e. More specifically, for example, a rectangular frame image which surrounds the corresponding image 370a and which is colored light blue, yellow, or the like is applied to the corresponding image 370a that corresponds to the first file icon 310a. On the other hand, a colored image is not applied to the corresponding image 370e that corresponds to the second file icon 310e.

Otherwise, for example, the corresponding image 370a that corresponds to the first file icon 310a selected by the user and the corresponding image 370e that corresponds to the second file icon 310e may be colored differently. More specifically, the corresponding image 370a that corresponds to the first file icon 310a selected by the user is colored light blue, and the corresponding image 370e that corresponds to the second file icon 310e is colored yellow.

As another example, the corresponding image 370a that corresponds to the first file icon 310a selected by the user may be configured to blink, and the corresponding image 370e that corresponds to the second file icon 310e may be configured not to blink. As another example, the corresponding image 370a that corresponds to the first file icon 310a selected by the user and the corresponding image 370e that corresponds to the second file icon 310e may be configured to have different display sizes.

In the display example illustrated in FIG. 14, a portion of the second file icon 310e is positioned behind the enlarged image 360. In the case of the present exemplary embodiment, the corresponding image 370 is displayed for the portion of the icon 310 that is positioned behind the enlarged image 360. In FIG. 14, the corresponding image 370e that corresponds to the portion of the second file icon 310e that is positioned behind the enlarged image 360 is displayed. In FIG. 14, by using the corresponding image 370e to display the portion that is positioned behind the enlarged image 360, information about the second file icon 310e is displayed.

Otherwise, in a state in which the icon 310 not selected by the user is positioned behind the enlarged image 360, the corresponding image 370 that corresponds to the icon 310 may be displayed if the user performs a specific operation. Specifically, for example, in FIG. 14, the corresponding image 370e corresponds to the icon 310 not selected by the user, but the corresponding image 370e may also be displayed according to a specific operation performed by the user after the enlarged image 360 is displayed. Examples of the specific operation include an operation for changing the position of the cursor 200, an operation for positioning the cursor 200 in a specific location, and an operation for giving an instruction to display the corresponding image 370.

Otherwise, the corresponding image 370 that corresponds to the icon 310 not selected by the user may also be hidden in response to a specific operation performed by the user after the enlarged image 360 is displayed. Examples of the operation by the user include an operation causing the cursor 200 to stop for a predetermined time or more, an operation for selecting a specific location, and an operation for giving an instruction to hide the corresponding image 370.

Figure 15:
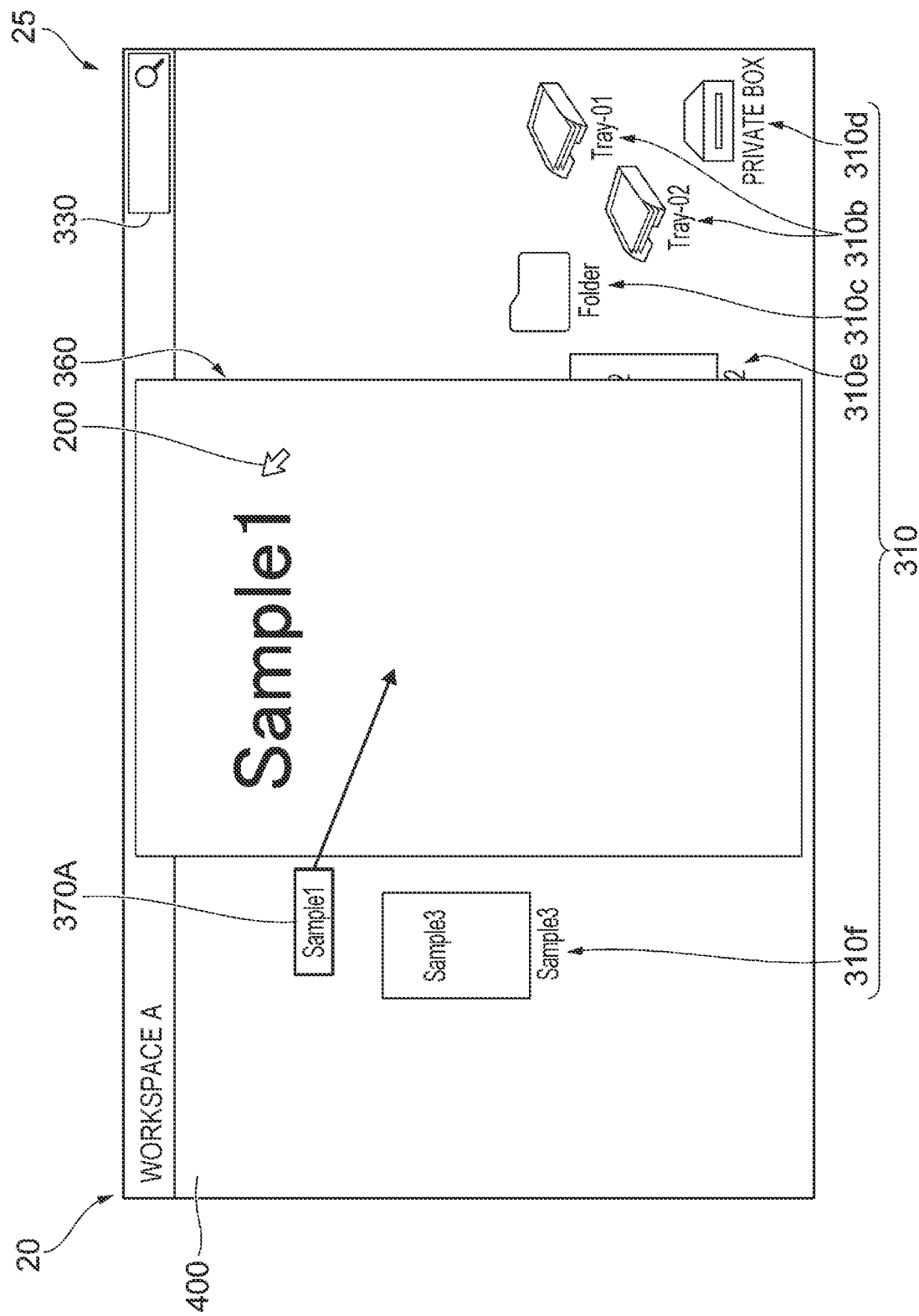
FIG. 15 is a diagram illustrating another display example on a display.

FIG. 15 is a diagram illustrating another display example on the display 25. In the display example illustrated in FIG. 15, like the case described above, the first file icon 310a (see FIG. 4; hidden in FIG. 15) from which the enlarged image 360 originates is positioned behind the enlarged image 360. In the display example, a corresponding image 370A indicating information that corresponds to the first file icon 310a selected by the user is displayed in a location apart from the display area of the enlarged image 360.

The corresponding image 370A given as one example of a file-corresponding image is an image that corresponds to the file represented by the first file icon 310a from which the display of the enlarged image 360 originates. In the present exemplary embodiment, an arrow is also displayed in addition to the corresponding image 370A, the arrow being an example of an image indicating the location where the first file icon 310a was displayed.

<Information to be Managed by Information Processing System>

FIG. 16 is a diagram illustrating an example of information managed by the information processing system 1. FIG. 16 illustrates information to be recorded in the secondary storage 12, 22 as the information to be managed by the information processing system 1.

In the example illustrated in FIG. 16, for each file managed by the information processing system 1, a file identifier that identifies the file, a file name, and the position of the icon 310 corresponding to the file to be displayed in the workspace 400 are recorded in the secondary storage 12, 22. Also, for each file managed by the information processing system 1, the path to a thumbnail image to be used in the display of the icon 310, the path to an enlarged image to be used in the display of the enlarged image 360, and the path to a file to be used in the display of the actual file are recorded in the secondary storage 12, 22.

The information processing system 1 acquires the above information recorded in the secondary storage 12, 22 on the basis of a user operation, and information to be used to control the display on the display 25 provided in the terminal device 20 is generated. Thereafter, the terminal device 20 controls the display according to the generated information. With this arrangement, the various screens are displayed on the display 25 of the terminal device 20.

Also, in the exemplary embodiment, the information processing system 1 manages the path to a corresponding image to be used in the display of the corresponding image 370. Specifically, the information processing system 1 manages paths to corresponding images in units of files. In the case of displaying the corresponding image 370, the information processing system 1 specifies the file for which the corresponding image 370 is to be displayed on the basis of the managed path to the corresponding image, and the corresponding image 370 corresponding to the specified file is displayed on the display 25.

<Flow of Processes>

Figure 17:
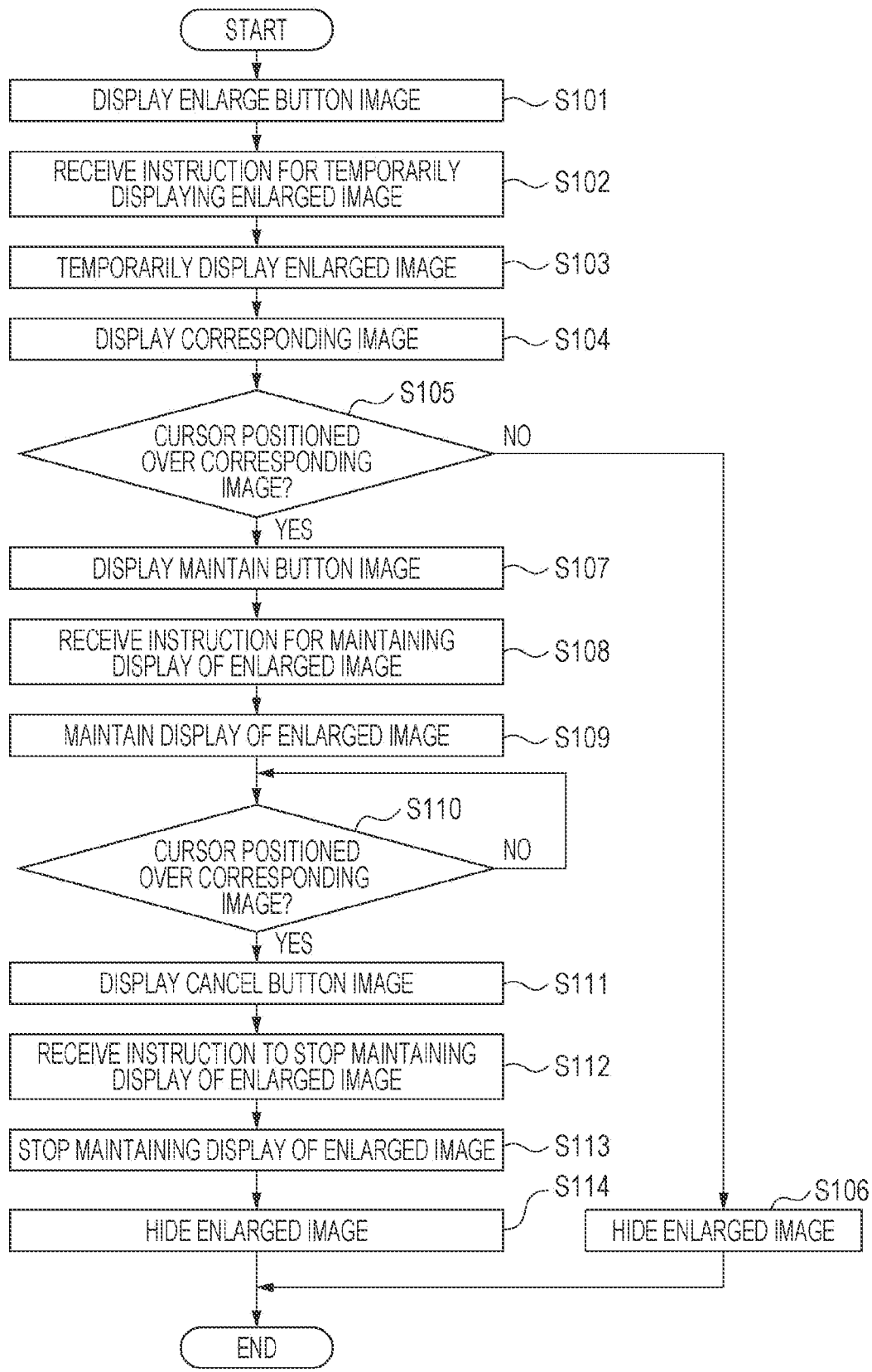
FIG. 17 is a flowchart illustrating a flow of processes executed when displaying an enlarged image and a corresponding image to which an exemplary embodiment is applied.

Next, a sequential flow of the processes described above will be described with reference to FIG. 17. Note that the following takes the example of a case where the user uses the input unit 24 such as a mouse to move the cursor 200, which is one example of a pointer image, over the display screen. Also, FIG. 17 illustrates the flow of processes for the case where the icon 310 from which the display of the enlarged image 360 originates is positioned behind the enlarged image 360.

In the exemplary embodiment, first, the terminal device 20 displays the enlarge button image 311 (see FIG. 4) on the basis of a user operation performed via the input unit 24 (step 101). Specifically, the terminal device 20 determines whether the cursor 200 is positioned over the icon 310 (see FIG. 4), and displays the enlarge button image 311 if the cursor 200 is positioned over the icon 310.

Next, the terminal device 20 receives an instruction for temporarily displaying the enlarged image 360 (see FIG. 5) on the basis of a user operation performed via the input unit 24 (step 102). Specifically, the terminal device 20 determines whether a user operation was performed on the enlarge button image 311, and receives the instruction for temporarily displaying the enlarged image 360 if there was an operation.

In response, the terminal device 20 temporarily displays the enlarged image 360 on the display 25 (step 103). Specifically, the terminal device 20 temporarily displays the enlarged image 360 at a higher level than the display level of the icon 310 on which the enlarge button image 311 that was operated by the user was displayed. The icon 310 from which the display of the enlarged image 360 originates is positioned behind the enlarged image 360.

Also, the terminal device 20 displays the corresponding image 370 on the display 25 (step 104). Specifically, the terminal device 20 displays the corresponding image 370 corresponding to the icon 310 from which the display of the enlarged image 360 originates in the location where the icon 310 was displayed.

Next, the terminal device 20 specifies whether the cursor 200 is positioned over the corresponding image 370 (step 105). If the cursor 200 is not positioned over the corresponding image 370 (S105, NO), the terminal device 20 hides the temporarily displayed enlarged image 360 (step 106).

On the other hand, if the cursor 200 is positioned over the corresponding image 370 (S105, YES), the terminal device 20 displays the maintain button image 312 (see FIG. 5) on the display 25 (step 107). Next, the terminal device 20 receives an instruction for maintaining the display of the enlarged image 360 (step 108). Specifically, the terminal device 20 determines whether a user operation was performed on the maintain button image 312, and receives the instruction for maintaining the display of the enlarged image 360 if there was an operation.

In response, the terminal device 20 maintains the display of the enlarged image 360 displayed on the display 25 (step 109). Specifically, the terminal device 20 maintains the display of the enlarged image 360 even if the cursor 200 moves off the corresponding image 370.

Next, the terminal device 20 specifies whether the cursor 200 is positioned over the corresponding image 370 (step 110). If the cursor 200 is not positioned over the corresponding image 370 (S110, NO), the terminal device 20 stands by until the cursor 200 is positioned over the corresponding image 370.

On the other hand, if the cursor 200 is positioned over the corresponding image 370 (S110, YES), the terminal device 20 displays the cancel button image 313 (see FIG. 7) on the display 25 (step 111). Next, in this process example, the terminal device 20 receives an instruction for canceling the maintaining of the display of the enlarged image 360 (step 112). Specifically, the terminal device 20 receives a user operation performed on the cancel button image 313.

In response, the terminal device 20 cancels the maintaining of the display of the enlarged image 360 displayed on the display 25 (step 113). Next, if the cursor 200 moves off the corresponding image 370, the terminal device 20 hides the enlarged image 360 (step 114).

(Other)

The maintain button image 312 and the cancel button image 313 do not have move uniformly with the cursor 200, and may be configured to move together with the cursor 200 if the user gives an instruction. In other words, for example, if the user selects a mode for changing the display location of the maintain button image 312 and the cancel button image 313, the display location of the maintain button image 312 and the cancel button image 313 may be changed to move together with the cursor 200.

Also, the movement of the maintain button image 312 and the cancel button image 313 is not limited to being dependent on the movement of the cursor 200, and may also depend on another condition. For example, the maintain button image 312 and the cancel button image 313 may be moved if the enlarged image 360 has been displayed for an elapsed time equal to or greater than a threshold value, or if an instruction for changing the display location of the maintain button image 312 and the cancel button image 313 is given.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor configured to:
cause an enlarged image to be displayed when a file image is selected, the file image being an image which is displayed on a display and which corresponds to a file, and the enlarged image being an image which corresponds to a selected file image, that is, the file image that is selected, and which has a larger display size than the selected file image; and
cause a file-corresponding image to be displayed on the display when the selected file image is positioned behind the enlarged image, the file-corresponding image being an image that corresponds to the selected file image;

cause a button image for receiving, from a user, an instruction related to the display of the enlarged image to be displayed in a location where the file-corresponding image is displayed;

change the display location of the button image when the button image overlaps with an image on the enlarged image; and cause the button image to move together with a pointer image that indicates a user operation location on the display.

2. The information processing system according to claim 1, wherein the processor is configured to cause the file-corresponding image to be displayed in a location where the selected file image was displayed.

3. The information processing system according to claim 2, wherein the processor is configured to cause an image obtained by applying transparency to the selected file image to be displayed as the file-corresponding image.

4. The information processing system according to claim 1, wherein the processor is configured to hide the file-corresponding image when a predetermined condition is satisfied.

5. The information processing system according to claim 4, wherein the processor is configured to:

cause a reception image for receiving a user operation with respect to the enlarged image to be displayed; and hide the file-corresponding image when the reception image is selected.

6. The information processing system according to claim 1, wherein when another file image different from the selected file image is positioned behind the enlarged image, the processor is configured to cause information about the other file image to also be displayed on the display.

7. The information processing system according to claim 6, wherein the processor is configured to differentiate an appearance of the file-corresponding image from an appearance of the information about the other file image.

8. The information processing system according to claim 6, wherein when a user performs a specific operation in a state in which the other file image is positioned behind the enlarged image, the processor is configured to cause the information about the other file image to be displayed on the display.

9. An information processing method comprising:

causing an enlarged image to be displayed when a file image is selected, the file image being an image which is displayed on a display and which corresponds to a file, and the enlarged image being an image which corresponds to a selected file image, that is, the file image that is selected, and which has a larger display size than the selected file image; and causing a file-corresponding image to be displayed on the display when the selected file image is positioned behind the enlarged image, the file-corresponding image being an image that corresponds to the selected file image;

causing a button image for receiving, from a user, an instruction related to the display of the enlarged image to be displayed in a location where the file-corresponding image is displayed;

changing the display location of the button image when the button image overlaps with an image on the enlarged image; and causing the button image to move together with a pointer image that indicates a user operation location on the display.

10. A non-transitory computer readable medium storing a program causing a computer to execute a process comprising:

causing an enlarged image to be displayed when a file image is selected, the file image being an image which is displayed on a display and which corresponds to a file, and the enlarged image being an image which corresponds to a selected file image, that is, the file image that is selected, and which has a larger display size than the selected file image; and causing a file-corresponding image to be displayed on the display when the selected file image is positioned behind the enlarged image, the file-corresponding image being an image that corresponds to the selected file image;

causing a button image for receiving, from a user, an instruction related to the display of the enlarged image to be displayed in a location where the file-corresponding image is displayed;

changing the display location of the button image when the button image overlaps with an image on the enlarged image; and causing the button image to move together with a pointer image that indicates a user operation location on the display.

* * * * *